(12) United States Patent
Sommerlade et al.

(10) Patent No.: US 11,017,575 B2
(45) Date of Patent: May 25, 2021

(54) METHOD AND SYSTEM FOR GENERATING DATA TO PROVIDE AN ANIMATED VISUAL REPRESENTATION

(71) Applicant: RealD Spark, LLC, Beverly Hills, CA (US)

(72) Inventors: Eric Sommerlade, Oxford (GB); Alexandros Neophytou, Oxford (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/275,890

(22) Filed: Feb. 14, 2019

(65) Prior Publication Data

US 2019/0266774 A1   Aug. 29, 2019

Related U.S. Application Data

(60) Provisional application No. 62/635,218, filed on Feb. 26, 2018.

(51) Int. Cl.
*G06T 13/00* (2011.01)
*G06T 13/40* (2011.01)
(Continued)

(52) U.S. Cl.
CPC .............. *G06T 13/40* (2013.01); *A63F 13/86* (2014.09); *G06K 9/00302* (2013.01); *H04N 7/157* (2013.01)

(58) Field of Classification Search
None
See application file for complete search history.

(56) References Cited

U.S. PATENT DOCUMENTS 6,283,858 B1   9/2001   Hayes, Jr. et al.
8,942,434 B1   1/2015   Karakotsios et al.
(Continued)

FOREIGN PATENT DOCUMENTS

CN   102012742 A   4/2011
CN   103310186 A   9/2013
(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT %20ePrivacy%20Filter%20software%20professional%20version_3MF-EPFPRO&cpncode=37-7582919&srccode=cii_10191459#PO; Copyright 2007-2016.
(Continued)

*Primary Examiner* — Martin Mushambo
(74) *Attorney, Agent, or Firm* — Penny L. Lowry

(57) ABSTRACT

Generating data to provide an animated visual representation is disclosed. A method comprises receiving input data obtained by a first sensor system measuring information about at least one target person. One data unit is selected from a database comprising a plurality of the data units. Each data unit comprises information about a reference person in a reference state measured at a previous time by the first sensor system or by a second sensor system. The information in each data unit allows generation of an animated visual representation of the reference person in the reference state. The reference state is different for each of the data units. The selected data unit and the input data are used to generate output data usable to provide an animated visual representation corresponding to the target person and synchronized with activity of the target person measured by the first sensor system.

30 Claims, 11 Drawing Sheets

(51) Int. Cl.
*A63F 13/86* (2014.01)
*H04N 7/15* (2006.01)
*G06K 9/00* (2006.01)

(56) References Cited

U.S. PATENT DOCUMENTS

| | | | |
|---|---|---|---|
| 9,224,060 | B1 | 12/2015 | Ramaswamy |
| 9,224,248 | B2 | 12/2015 | Ye et al. |
| 9,378,574 | B2 | 6/2016 | Kim et al. |
| 9,740,282 | B1 | 8/2017 | McInerny |
| 9,872,007 | B2 | 1/2018 | Woodgate et al. |
| 9,986,812 | B2 | 6/2018 | Yamanashi et al. |
| 2002/0013691 | A1 | 1/2002 | Warnes |
| 2003/0197779 | A1 | 10/2003 | Zhang et al. |
| 2003/0218672 | A1 | 11/2003 | Zhang et al. |
| 2005/0053274 | A1 | 3/2005 | Mayer et al. |
| 2005/0104878 | A1 | 5/2005 | Kaye et al. |
| 2007/0019882 | A1 | 1/2007 | Tanaka et al. |
| 2007/0244606 | A1 | 10/2007 | Zhang et al. |
| 2011/0063465 | A1 | 3/2011 | Nanu et al. |
| 2011/0199460 | A1 | 8/2011 | Gallagher |
| 2012/0105486 | A1 | 5/2012 | Lankford et al. |
| 2012/0114201 | A1 | 5/2012 | Luisi et al. |
| 2012/0219180 | A1 | 8/2012 | Mehra |
| 2012/0223956 | A1 | 9/2012 | Saito et al. |
| 2012/0236133 | A1 | 9/2012 | Gallagher |
| 2012/0319928 | A1 | 12/2012 | Rhodes |
| 2013/0070046 | A1 | 3/2013 | Wolf et al. |
| 2013/0076853 | A1 | 3/2013 | Diao |
| 2013/0163659 | A1 | 6/2013 | Sites |
| 2014/0002586 | A1 | 1/2014 | Nourbakhsh |
| 2014/0016871 | A1 | 1/2014 | Son et al. |
| 2014/0267584 | A1 | 9/2014 | Atzpadin et al. |
| 2014/0368602 | A1 | 12/2014 | Woodgate et al. |
| 2015/0077526 | A1 | 3/2015 | Kim et al. |
| 2015/0269737 | A1 | 9/2015 | Lam et al. |
| 2015/0339512 | A1 | 11/2015 | Son et al. |
| 2016/0125227 | A1 | 5/2016 | Soare et al. |
| 2016/0196465 | A1 | 7/2016 | Wu et al. |
| 2016/0219258 | A1 | 7/2016 | Woodgate et al. |
| 2017/0134720 | A1 | 5/2017 | Park et al. |
| 2017/0195662 | A1 | 7/2017 | Sommerlade et al. |
| 2017/0354882 | A1* | 12/2017 | Kono .................. G02B 27/017 |
| 2017/0364149 | A1 | 12/2017 | Lu et al. |
| 2018/0035886 | A1 | 2/2018 | Courtemanche et al. |
| 2018/0321817 | A1* | 11/2018 | Terahata ............. G02B 27/017 |

FOREIGN PATENT DOCUMENTS

| | | |
|---|---|---|
| JP | 2007109255 A | 4/2007 |
| JP | 2007273288 A | 10/2007 |
| WO | 2011148366 A1 | 12/2011 |
| WO | 2016132148 A1 | 8/2016 |

OTHER PUBLICATIONS

Cao et al., "Real-Time High-Fidelity Facial Performance Capture." ACM Transactions on Graphics (SIGGRAPH 2015).
Cao et al., "Realtime Multi-Person 2D Pose Estimation using Part Affinity Fields." IEEE/CVPR 2017.
CN-201680028919.9—Notification of the 1st Office Action dated Nov. 4, 2020 of China Patent Office.
CN-201780006239.1—Notification of the 1st Office Action dated Sep. 30, 2020 of China Patent Office.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
Ekman et al., "Facial Action Coding System: A Technique for the Measurement of Facial Movement.", Consulting Psychologists Press, Palo Alto, 1978.
EP-17736268.8 European Extended Search Report of European Patent Office dated Jul. 12, 2019.
Ganin et al., "DeepWarp: Photorealistic Image Resynthesis for Gaze Manipulation", Jul. 25, 2016, XP055295123, Retrieved from Internet: URL: http://arxiv.org/pdf/1607.07215v2.pdf (retreived on Jan. 10, 2018].
Giger et al., "Gaze Correction with a Single Webcam", Proceedings of IEEE ICME 2014 (Chengdu, China, Jul. 14-18, 2014).
Ho, "Random Decision Forests", Proceedings of the 3rd International Conference on Document Analysis and Recognition, Montreal, QC, pp. 278-282, Aug. 14-16, 1995.
International Preliminary Report on Patentability dated Sep. 26, 2017 in International Patent Application No. PCT/RU2016/000118.
International Search Report and Written Opinion dated Apr. 18, 2017 in International Patent Application No. PCT/US17/12203.
International Search Report and Written Opinion dated Aug. 25, 2016 in International Patent Application No. PCT/RU2016/000118.
International Search Report and Written Opinion dated Oct. 16, 2018 in International Patent Application No. PCT/US18/45648.
Kononenko et al., "Learning to Look Up: Realtime Monocular Gaze Correction Using Machine Learning", Computer Vision and Pattern Recognition, pp. 4667-4675, 2015.
Lowe, "Distinctive Image Features from Scale-Invariant Keypoints", International Journal of Computer Vision 60 (2), pp. 91-110, 2004.
Marschner et al., "Fundamentals of Computer Graphics.", A K Peters/CRC Press; 4 edition (Dec. 15, 2015).
Ozuysal et al., "Fast Keypoint recognition in Ten Lines of Code", Computer Vision and Pattern Recognition, pp. 1-8, 2007.
Paysan et al. "A 3D Face Model for Pose and Illumination Invariant Face Recognition.", 6th IEEE International Conference on Advanced Video and Signal based Surveillance (AVSS) for Security, Safety and Monitoring in Smart Environments, 2009.
Redmon et al., "YOLO9000: Better, Faster, Stronger", IEEE/CVPR, 2017.
Ren et al., "Face alignment at 3000 fps via regressing local binary features", CVPR, pp. 1685-1692, 2014.
Saffari et al., "On-line Random Forests", 3rd IEEE ICCV Workshop, On-line Computer Vision, 2009.
Sahoo et al., "Online Deep Learning: Learning Deep Neural Networks on the Fly", School of Information Systems, Singapore Management University (https://arxiv.org/abs/1711.03705), 2017, pp. 1-9.
Smith et al., Gaze locking: passive eye contact detection for human-object interaction. In Proceedings of the 26th annual ACM Symposium on User interface software and technology, pp. 271-280, ACM 2013.
Viola and Jones, "Rapid Object Detection using a Boosted Cascade of Simple Features", pp. 1-9 CVPR 2001.
Xiong et al., "Supervised descent method and its applications to face alignment", In Computer Vision Pattern Recognition (CVPR), 2013 IEEE Conference, pp. 532-539.
Yang, "Mutli-scale recognition with DAG-CNNs", ICCV 2015.
Yip, "Face and Eye Rectification in Video Conference Using Artificial Neural Network", IEEE International Conference on Multimedia and Expo, 2005, pp. 690-693.
Zach et al., "A Duality Based Approach for Realtime TV-L1 Optical Flow", Pattern Recognition (Proc. DAGM), 2007, pp. 214-223.
Zheng et al., "Conditional Random Fields as Recurrent Neural Networks.", International Conference on Computer Vision (ICCV), 2015.

* cited by examiner

METHOD AND SYSTEM FOR GENERATING DATA TO PROVIDE AN ANIMATED VISUAL REPRESENTATION

TECHNICAL FIELD

This disclosure generally relates to animation, and more specifically relates to providing an animated visual representation of a person synchronized with activity of the person, for example in the context of videoconferencing or generating of an animated avatar in a virtual environment.

BACKGROUND

Videoconferencing is becoming more common as data connections between remote locations improve. Technological limitations still limit the quality of such meetings. Cameras in meeting rooms are typically in unnatural positions to capture the room and participants as a whole, and are fixed in place and orientation. It can be difficult to see who is talking, who is being addressed, and to make out subtle gestures.

Virtual environments are commonly created within video games and have been proposed as an alternative for videoconferencing. This provides more flexibility but can be difficult to implement at reasonable cost. It is also still difficult for interactions to be fully detailed and natural. Equipment required to implement virtual reality, such as virtual reality goggles, limit the natural interaction for its users.

BRIEF SUMMARY

According to an aspect of the invention, there is provided a method of generating data to provide an animated visual representation, comprising: receiving input data obtained by a first sensor system measuring information about at least one target person; selecting one data unit from a database comprising a plurality of the data units, wherein each data unit comprises information about a reference person in a reference state measured at a previous time by the first sensor system or by a second sensor system, the information in each data unit is such as to allow generation of an animated visual representation of the reference person in the reference state, and the reference state is different for each of the data units; and using the selected data unit and the input data to generate output data usable to provide an animated visual representation corresponding to the target person and synchronized with activity of the target person measured by the first sensor system.

According to an alternative aspect, there is provided a system for generating data to provide an animated visual representation, comprising: a first computing system configured to: receive input data obtained by a first sensor system measuring information about at least one target person; select one data unit from a database comprising a plurality of the data units, wherein each data unit comprises information about a reference person in a reference state measured at a previous time by the first sensor system or by a second sensor system, the information in each data unit is such as to allow generation of an animated visual representation of the reference person in the reference state, and the reference state is different for each of the data units; and use the selected data unit and the input data to generate output data, wherein the output data is usable to provide an animated visual representation corresponding to the target person and synchronized with activity of the target person measured by the first sensor system.

Any of the aspects of the present disclosure may be applied in any combination.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
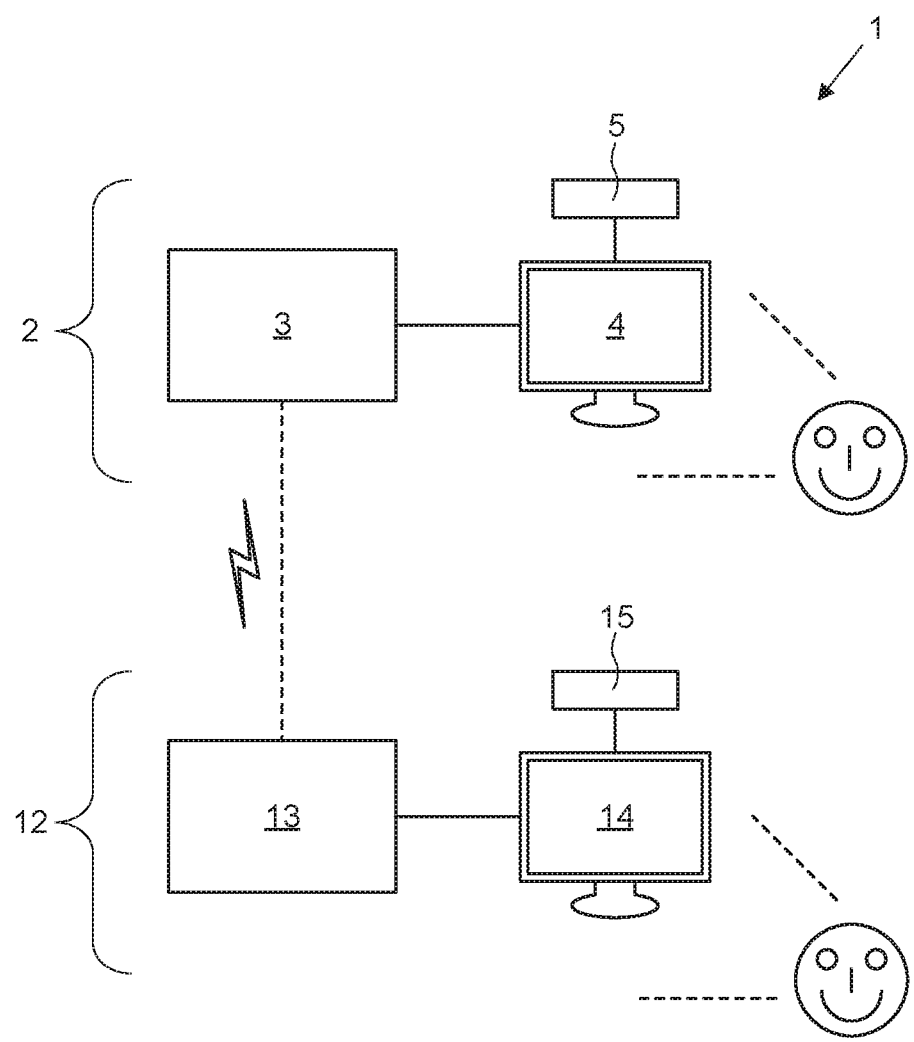
FIG. 1 is a schematic diagram depicting an example system for generating an animated visual representation of a target person.

Videoconferencing is becoming more common as data connections between remote locations improve. Technological limitations still limit the quality of such meetings. Cameras in meeting rooms are typically in unnatural positions to capture the room and participants as a whole, and are fixed in place and orientation. It can be difficult to see who is talking, who is being addressed, and to make out subtle gestures.

Virtual environments are commonly created within video games and have been proposed as an alternative for videoconferencing. This provides more flexibility but can be difficult to implement at reasonable cost. It is also still difficult for interactions to be fully detailed and natural.

Equipment required to implement virtual reality, such as virtual reality goggles, limit the natural interaction for its users.

Some embodiments of the disclosure include a method which uses recordings of a target person obtained at previous times to augment an animated visual representation generated based on real time measurements by a sensor system. The animated visual representation may be synchronized with measured activity of the target person, thereby providing "live video", optionally at a frame rate that is equal to the frame rate measured by the sensor system. By appropriate selection of the data units, various aspects of how the animated visual representation appears can be controlled by the target person in a highly flexible manner and without excessive data processing cost. The flexibility can be used to improve a quality of the animation, for example by correcting for shortcomings in the sensor system that is capturing images or other information about the target person during the animation (e.g. network bandwidth, missing frames, camera focus, lighting conditions, etc.), as well as allowing for modifications of the animation that do not correspond with a current state of the target person (e.g. modifying clothing, hairstyling, grooming condition, etc.).

A simple use example is where a user wishes to participate in a video conference with business partners but has not shaved or is wearing the wrong outfit. Embodiments of the disclosed method may solve this problem by providing a data unit in the database that represents the user in a shaved state wearing the correct outfit. The method may then augment the animated visual representation to make it appear as if the user has shaved and is wearing the correct outfit. The live video feed may be effectively augmented or fully replaced by new video data generated from previously recorded sensor measurements of the user, but animated according to the current live actions of the user.

In some embodiments, the database is incrementally updated using measurement data from the first sensor system or second sensor system. The database can thus be gradually refined as more visual information is gathered over time. The database may even be updated during generation of the animated visual representation to improve future performance.

In some embodiments, one or more of the data units comprises multi-modal information comprising visual information correlated with audio information measured at the same time as the visual information. The first sensor system may measure only sound from the target person and the generation of the output data may be performed using the correlation between the visual information and the audio information in a selected one of the data units. This embodiment allows a synchronized animated visual representation of the target person (while speaking, for example) to be generated even without any images of the target person being received during the animation. This may allow the target person to participate in a videoconference, for example, using only voice input at the time of the videoconference. Animated images of the target person corresponding to the voice input (e.g. showing the target person saying the words) may be generated synthetically.

Methods of the present disclosure may be computer-implemented. Each step of the disclosed methods may therefore be performed by a computer. The computer may comprise various combinations of computer hardware, including for example CPUs, RAM, SSDs, motherboards, network connections, firmware, software, and/or other elements known in the art that allow the computer hardware to perform the required computing operations. The required computing operations may be defined by one or more computer programs. The one or more computer programs may be provided in the form of media, optionally non-transitory media, storing computer readable instructions. When the computer readable instructions are read by the computer, the computer performs the required method steps. The computer may consist of a self-contained unit, such as a general-purpose desktop computer, laptop, tablet, mobile telephone, smart device (e.g. smart TV), etc. Alternatively, the computer may consist of a distributed computing system having plural different computers connected to each other via a network such as the internet or an intranet.

FIG. 1 depicts a system 1 for generating an animated visual representation according to some embodiments. The system 1 comprises a local computing system 2 (an example of a "first computing system") and a remote computing system 12 (an example of a "second processing system"). The local computing system 2 in this embodiment comprises a local processing unit 3 (e.g. a mobile computing device or a desktop computer), a local display 4 (e.g. a monitor, an autostereoscopic display, or VR/AR headset), and a local sensor system 5 (e.g. a video camera such as a webcam and a microphone). The remote computing system 12 in this embodiment comprises a remote processing unit 13 (e.g. a mobile computing device or a desktop computer), a remote display 14 (e.g. a monitor, an autosteroscopic display, or VR/AR headset), and a remote sensor system 15 (e.g. a video camera such as a webcam and a microphone).

Figure 2:
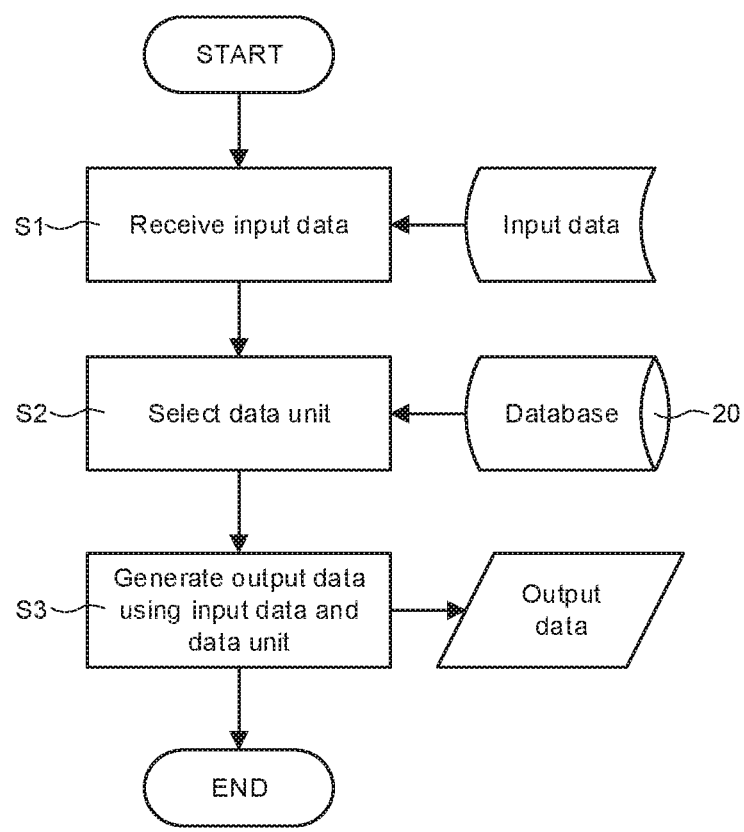
FIG. 2 is a flow chart depicting an example method of generating an animated visual representation.

FIG. 2 is a flow chart depicting steps in an example method for generating an animated visual representation. The steps could be performed by the system 1 of FIG. 1.

In step S1, input data is received from a first sensor system. The first sensor system measures information about at least one target person. In the example of FIG. 1, the local sensor system 5 is an example of a first sensor system. The input data from the first sensor system is received in this case by the local processing unit 3. In the example of FIG. 1 the local sensor system 5 comprises a webcam and microphone. The first sensor system more generally may comprise one or more of the following: a camera, a depth sensor, a microphone, an accelerometer, a gyroscopic sensor, a haptic input sensor, or other sensor.

In step S2, a data unit 22 is selected from a database 20. The database 20 may be hosted by a server (i.e. remotely) or locally (e.g. within the local processing unit 3). An example structure of the database 20 is depicted schematically in the upper portion of FIG. 3. The database 20 may comprise a plurality N of data units 22. One example data unit 22 (the Kth) is shown in the lower portion of FIG. 3. Each data unit 22 comprises information about a reference person (which may be one or more of the at least one target person) in a reference state 24 measured at a previous time by the first sensor system or by a second sensor system. In some embodiments, at least a subset of the data units 22 are generated or updated using the local sensor system 5 of the local computing system 2. In some embodiments, the database 20 and the local processing unit 3 are accessible only for a target person (and not via the remote computing system 12. Thus, the database 20 may be accessible by the local computing system 2 and not by the remote computing system 12. The reference state 24 is different for each data unit 22. The data units 22 may be thus correlated in a one-to-one correspondence with the reference states. The second sensor system, where provided, may take any of the forms described above for the first sensor system. The information in each data unit 22 is such as to allow generation of an animated visual representation (e.g. a visual rendering) of the reference person in the reference state 24. In some embodiments, each data unit 22 comprises a plurality of key portions 26 (e.g. visual keyframes) of measurement data captured at a previous time. Key portions 26 may comprise visual keyframes representing views of the reference person from different directions or from the same direction but with different facial expressions or mouth movements, for example. M example key portions 26 are present in the example data unit 22 shown in FIG. 3, each key portion comprising different information about the reference person (represented schematically by different portions of the face symbol) while the reference person is in the same reference state. The key portions 26 may be stored with corresponding auxiliary and multi-modal data (e.g. audio recordings or other features that were sampled at the same times as the key portions). Further details about key portions 26 are given below. A data unit 22 may be updated when new measurement data is obtained and corresponds to the reference state of the data unit 22, for example to add, modify or replace key portions 26. Such incremental updating of the database 20 is discussed in further detail below.

The different reference states 24 may be organised in different predetermined categories or user defined categories. The categories may include, but are not limited to, for example, one or more of the following: an occasion dependent category (e.g. formal/informal dress); a mood dependent category (e.g. happy, concerned); a hair style category; a beard style category; an accessories category (e.g. earrings, piercings); a tattoo category (e.g. presence of, or absence of); a makeup category; a gender category; two or more age categories (e.g. young, middle aged, elderly); one or more lighting categories (e.g. dim lighting, bright lightness, sunlight, cloudy conditions, etc.); a skin tone category; a skin colour category.

Figure 3:
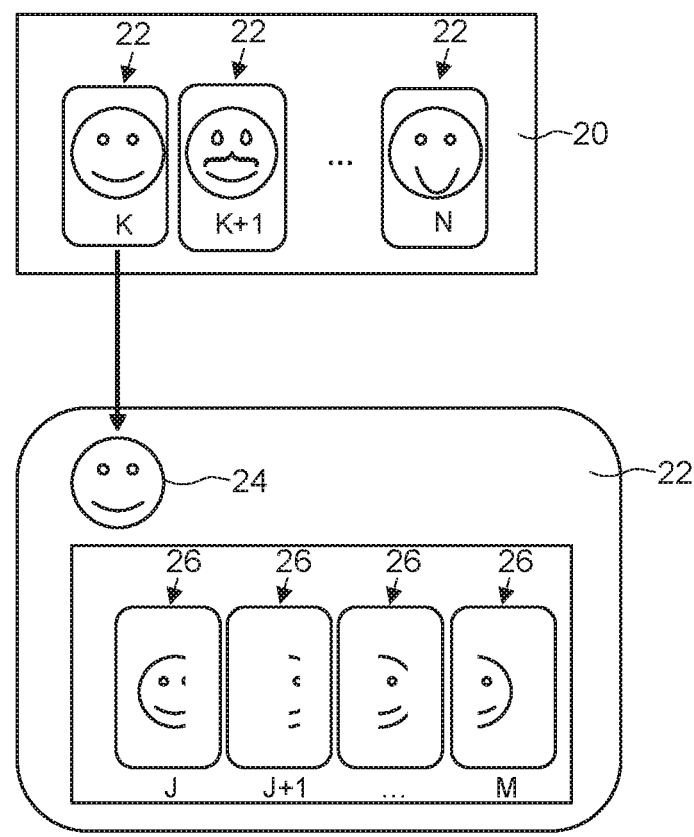
FIG. 3 is a schematic diagram depicting a database for use with the method of FIG. 2.

The different reference states 24 may comprise, but are not limited to, for example, one or more of the following: the reference person being in multiple different locations; the reference person being in multiple different environment conditions; the reference person being exposed to multiple different weather conditions; the reference person being exposed to multiple different lighting conditions; the reference person wearing multiple different combinations of garments (e.g. different clothes, glasses, hats, earrings); the reference person wearing multiple different skin decorations; the reference person being in multiple different moods. In the example of FIG. 3, three example data units 22 are shown in the upper part of the figure. In the Kth data unit 22, the reference state 24 corresponds to the reference person being shaven and of average happiness. In the K+1th data unit 22, the reference state 24 corresponds to the reference person being unshaven and of average happiness. In the Nth data unit 22, the reference state 24 corresponds to the reference person being shaven and of above-average happiness. The reference state 24 is different for each of the data units 22.

In step S3, the selected one of the data units 22 and the input data are used to generate output data. The output data may provide an animated visual representation corresponding to the target person and synchronized with activity of the target person measured by the first sensor system. In some embodiments, the animated visual representation is provided at the same frame rate as the input data provided by the first sensor system. In some embodiments, as depicted in FIG. 1 for example, the output data is sent over a network from a local computing system 2 (which may perform steps S1-S3) to a remote computing system 12 (which may provide the animated visual representation). Thus, a method is provided which allows information about a reference person stored in a database to be used in conjunction with input data from a sensor system to generate output data that is usable at a remote system to generate an animated visual representation corresponding to the target person. The method of output is not limited and could include, for example, output to a 2D display, to an (auto-)stereoscopic screen, a (virtual reality) VR or (augmented reality) AR headset, or to some other device.

In some embodiments, the animated visual representation provides a tele-presence of the target person, for example within a video conference, or in a virtual environment such as in a video game or virtual conference. In some embodiments, the animated visual representation may provide an avatar that moves in synchronization with the target person, wherein the avatar does not directly resemble the target person (e.g. the avatar may comprise a fictional character, an animal, a celebrity character, or some other character). By selecting different ones of the data units 22 in step S2 a user is able to modify how the animated visual representation will look at the remote system. In the simple example of FIG. 3, for example, a user who is unshaven could participate in a video-conference while appearing to be clean shaven by selecting the data unit 22 corresponding a clean-shaven version of himself.

In some embodiments, modifications to the animated visual representation may be made at the remote system. In such embodiments, the provision of the animated visual representation may be controlled according to one or more output parameters. The one or more output parameters may include, but are not limited to, one or more of the following: information from one or more sensors measuring visual conditions at the location remote from the target person; information from one or more sensors measuring the position, gaze direction, or both, of one or more people at the location remote from the target person; and information about characteristics of a display apparatus (e.g. size, resolution, position, etc.) at the location remote from the target person.

In some embodiments, the animated visual representation may have one or more of the following modifications relative to the input data obtained by the first sensor system: a gaze direction is changed; apparent lighting conditions to which the target person is subjected are changed; facial hair is removed, added, or modified; a facial accessory or skin decoration is removed, added, or modified; a background is changed; or some other modification may be made.

In some embodiments, the first sensor system comprises a virtual reality headset and the animated visual representation comprises a visual representation of the target person without the headset.

The activity of the person may include any visually recognizable change, including but not limited to, for example, relative movement of one or more parts of the body, optionally including changes in one or more of posture and facial expression. The information in each data unit 22 in such cases should be sufficient to allow such activity to be represented at the remote system. Techniques for generating and storing such information are well known in the art. In some embodiments, the information about the reference person in the reference state in each of one or more of the data units 22 may comprise, but is not limited to, one or more of the following while the reference person remains in the same reference state: information about a visual appearance of the reference person from different viewing directions; information about a visual appearance of the reference person in different postures; information about a visual appearance of the reference person with different facial expressions; information about a visual appearance of the reference person while making different vocal sounds. The information may be represented in different forms. For example, each data unit 22 may comprise one or more of the following: a set of two-dimensional visual features; a three-dimensional mesh, optionally including one or more of the following: colour information, surface information, surface texture information, surface roughness information, surface wrinkles information, information about animated objects on the surface; a compressed three-dimensional mesh, optionally including principle component analysis components over a principle component analysis basis of the mesh.

The activity of the person may include generating sound vocally. In some embodiments, each of one or more of the data units 22 comprises multi-modal information. The multi-modal information may comprise visual information (one mode) and audio information (another mode), for example. In some embodiments, visual information may be correlated with audio information measured at the same time as the visual information. For example, a correspondence may be recorded between changes in facial features (e.g. the shape of the mouth and surrounding tissue) and the utterance of each of a set of phonemes. In such an embodiment, even if the first sensor system is configured to measure only sound (e.g. via a telephone), the method can generate output data that allows an animated visual representation corresponding to the target person or his avatar speaking to be provided at the remote system. A user could thus participate normally in a videoconference or virtual meeting without having a camera at his local system and/or without needing to align himself appropriately in front of a camera (e.g. while travelling on public transport).

In some embodiments, the database 20 may be updated incrementally using measurements from the first sensor system or the second sensor system. The updating may comprise recording over a period of time and storing key portions 26 of the measurement data (e.g. key frames from a sequence of captured image frames). In some embodiments, a webcam and/or microphone on a laptop could be used to build up data units 22 during day-to-day use of the laptop by a user, as well as being used to obtain live input data to generate output data to implement a live videoconference.

In some embodiments, the incremental updating of the database 20 may comprise detecting key portions 26 of the measurement data and recording the detected key portions 26 in preference to other portions of the measurement data. In some embodiments, the detecting of the key portions 26 may comprise determining a degree of similarity between a candidate portion and one or more other portions of the measurement data. The candidate portion may be selected as a key portion, for example, only if the degree of similarity is lower than a predetermined threshold. In some embodiments, the degree of similarity may be assessed using a distance function. In this way, the extent to which highly repetitive portions are stored may be reduced, thereby reducing storage requirements and data access processing requirements.

In some embodiments, the detecting of the key portions 26 may comprise determining a quality metric of a candidate portion. The candidate portion may not be selected as a key portion 26, for example, if a value of the quality metric is lower than a predetermined threshold. The quality metric may comprise, but is not limited to, information about one or more of the following: a quality of focus in an image; a degree of contrast in an image; a degree to which the reference person is present in an image (e.g. to reject images where the reference person's face is blocked or absent, for example).

In some embodiments, each of one of more of the portions of measurement data (before or after being detected as key portions 26) may be assigned to one of the data units 22 depending on correspondence between content of each portion and the reference state of the data unit 22. For example, if it is detected that the reference person is in an unshaven state during a particular session of recording measurement data, portions of the measurement data may be assigned (before or after being selected as key portions 26) to one or more data units 22 corresponding to reference states in which the reference person is unshaven.

Figure 4:
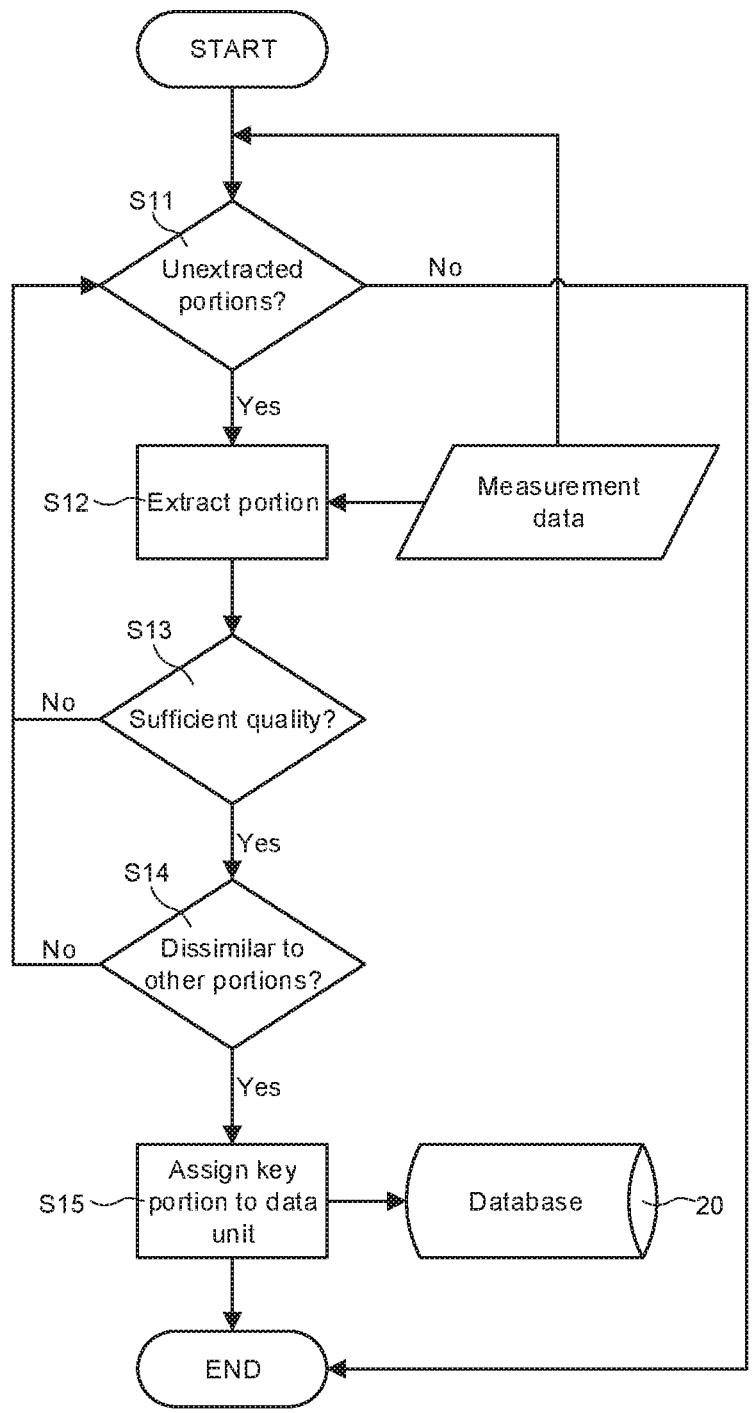
FIG. 4 is a flow chart depicting an example method for updating the database of FIG. 3.

An example scheme for implementing the updating of the database is depicted in FIG. 4.

In step S11, it is determined whether any portions of measurement data are yet to be extracted. Each portion may comprise one or more image frames from an image capture device, optionally in combination with audio packets correlated with the image frames. If all portions have already been extracted such that none remains to be extracted ("no"), the method ends. If some portions are yet to be extracted ("yes"), the method proceeds to step S12.

In step S12, a new portion of measurement data is extracted.

In step S13, the extracted portion is analysed to determine if the extracted portion is of sufficient quality, for example by calculating a quality metric as described above. If no, the method loops back to step S11. If yes, the method proceeds to step S14.

In step S14, the extracted portion is analysed to determine if the extracted portion is sufficiently dissimilar from other portions of the measurement data or reference portions of data stored elsewhere (e.g. in the database 20). This step may be performed by calculating a degree of similarity, as described above. If the extracted portion is not sufficiently dissimilar, the method loops back to step S11. If the extracted portion is sufficiently dissimilar, the method continues to step S15.

In step S15, the portion is determined to be a key portion and assigned to a data unit 22 depending on a correspondence between content of the key portion and the data unit 22, and stored in the database 20.

The order of the steps in FIG. 4 may be varied. For example, steps S13 and S14 could be reversed. The assignment process of step S15 could be performed before either or both of steps S13 and S14. The determination of sufficient dissimilarity of step S14 could then be performed on the basis of key portions already belonging to the data unit 22 to which the extracted portion has been assigned.

In some embodiments, each key portion 26 may be processed, e.g. in step S15 in a flow according to FIG. 4, to derive a virtual representation of the reference person. Example steps of such processing are shown in FIG. 5.

Figure 5:
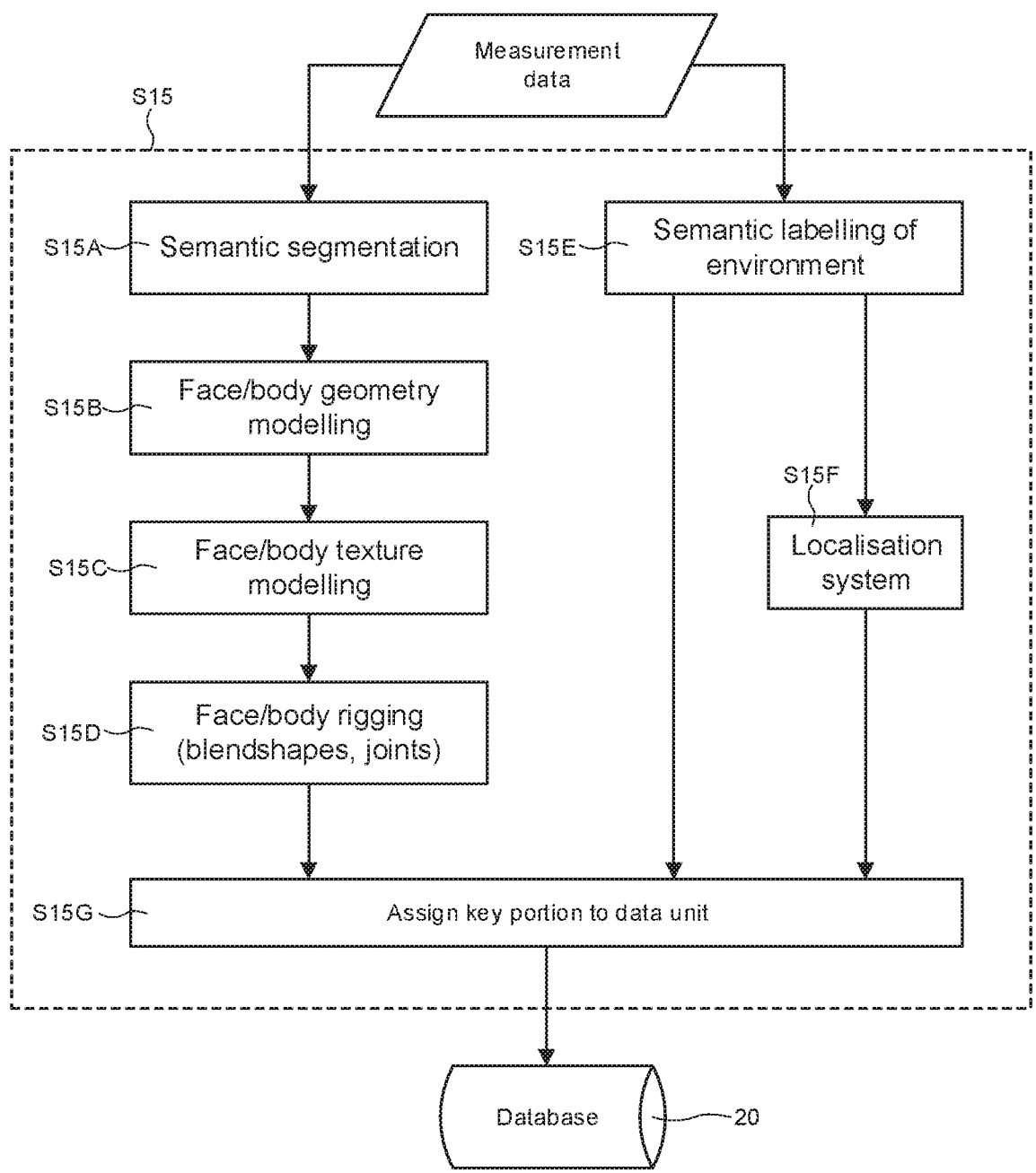
FIG. 5 is a schematic diagram depicting an example method of processing portions of measurement data.

As shown in FIG. 5, measurement data may be provided (from the first sensor system or the second sensor system), optionally via filtering steps such as steps S13 and S14 in FIG. 4, to remove portions of measurement data that are poor quality or repetitive. The measurement data may comprise an image sequence, audio and/or timestamps, and may be used to generate a virtual representation of a reference person (e.g. corresponding to a target person or user). In some embodiments, the virtual representation of the reference person is obtained by inferring parameters from a learnt model of human appearance.

As the database 20 is incrementally updated over time, acquisition of further key portions 26 may be aided by the virtual representations that are already present in the database 20.

In the embodiment shown, the processing comprises step S15A in which an image is segmented into a set of semantically meaningful regions, a non-exhaustive list of which are: face, body, hair, garments, background. This can be achieved by standard object segmentation methods. See, for example, Shuai Zheng, Sadeep Jayasumana, Bernardino Romera-Paredes, Vibhav Vineet, Zhizhong Su, Dalong Du, Chang Huang and Philip H. S. Torr. "Conditional Random Fields as Recurrent Neural Networks." International Conference on Computer Vision (ICCV), 2015, herein incorporated by reference in its entirety. This can also be achieved by model-based tracking methods. See, for example, Zhe Cao, Tomas Simon, Shih-En Wei, Yaser Sheikh. "Realtime Multi-Person 2D Pose Estimation using Part Affinity Fields." IEEE/CVPR 2017, herein incorporated by reference in its entirety.

Optionally, cues may be extracted from the images (key portions) by semantically labelling the environment (step S15E) where the session is being captured, for example to distinguish between office space and home space. See, for example, Joseph Redmon, Ali Farhadi. "YOLO9000: Better, Faster, Stronger." IEEE/CVPR, 2017, herein incorporated by reference in its entirety. In some embodiments, a localization system (e.g. GPS) is used to provide further clues about a likely context with which the measurement data is being captured (e.g. at home, at work, on holiday, etc.)—step S15F.

In some embodiments, modelling of face and/or body geometry may be performed (step S15B). In some embodiments, a parametric model may be used to infer information about the underlying 3D geometry of face and body of the user, as described in P. Paysan and R. Knothe and B. Amberg and S. Romdhani and T. Vetter. "A 3D Face Model for Pose and Illumination Invariant Face Recognition." Proceedings of the 6th IEEE International Conference on Advanced Video and Signal based Surveillance (AVSS) for Security, Safety and Monitoring in Smart Environments, 2009, herein incorporated by reference in its entirety.

In some embodiments, modelling of face and/or body texture may be performed (step S15C). In some embodiments, a parametric model is used to infer information about the user's skin colour, tone, hair colour, eye colour, wrinkles, bumps. This may be performed, for example, as described in Chen Cao, Derek Bradley, Kun Zhou, Thabo Beeler. "Real-Time High-Fidelity Facial Performance Capture." ACM Transactions on Graphics (SIGGRAPH 2015), herein incorporated by reference in its entirety.

In some embodiments, a parametric model may be used for animation and control of the virtual body and facial expressions (step S15D). This may be performed, for example, as described in Steve Marschner, Peter Shirley. Fundamentals of Computer Graphics. A K Peters/CRC Press; 4 edition (15 Dec. 2015), herein incorporated by reference in its entirety.

After all required processing steps are completed, each key portion 26 may be assigned to a data unit 22 and stored in the database 20. In some embodiments, the key portions 26 are time indexed. In some embodiments, multiple key portions 26 (e.g. key portions 26 representing views of the reference person from different directions) are processed as a group to derive a virtual representation of the reference person.

In some embodiments, the database 20 may be augmented by external content suitable for visual representation. In some embodiments, the external content may be provided by visual processing by an acquisition system 31 (see below) of video and audio sequences of persons other than the target person. In some embodiments, the external content may be provided by addition of 3D content to the database 20, e.g. a 3D model of glasses, hats etc. In some embodiments, the external content is a set of editing information to the representation, e.g. an image editing instruction to localized texture patches.

Figure 6:
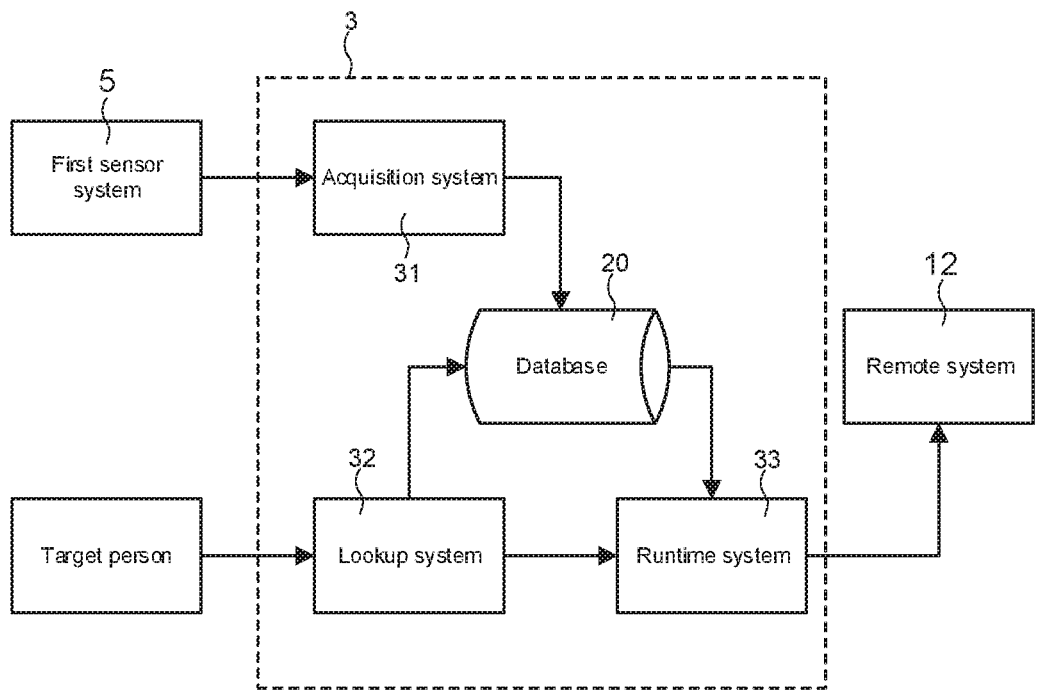
FIG. 6 is a schematic diagram depicting an example framework for implementing methods of the disclosure.

More specific example implementation details will now be described with reference to the framework depicted in FIG. 6. In the examples that follow, steps of the method may be performed by a local processing unit 3 implementing the following modules: acquisition system 31; lookup system 32; runtime system 33; and database 20. The modules may interact as shown in FIG. 6. Input to the method may be provided by first sensor system 5 and/or by a target person. Output data generated by the method may be output to a remote computing system 12 for display.

Figure 7:
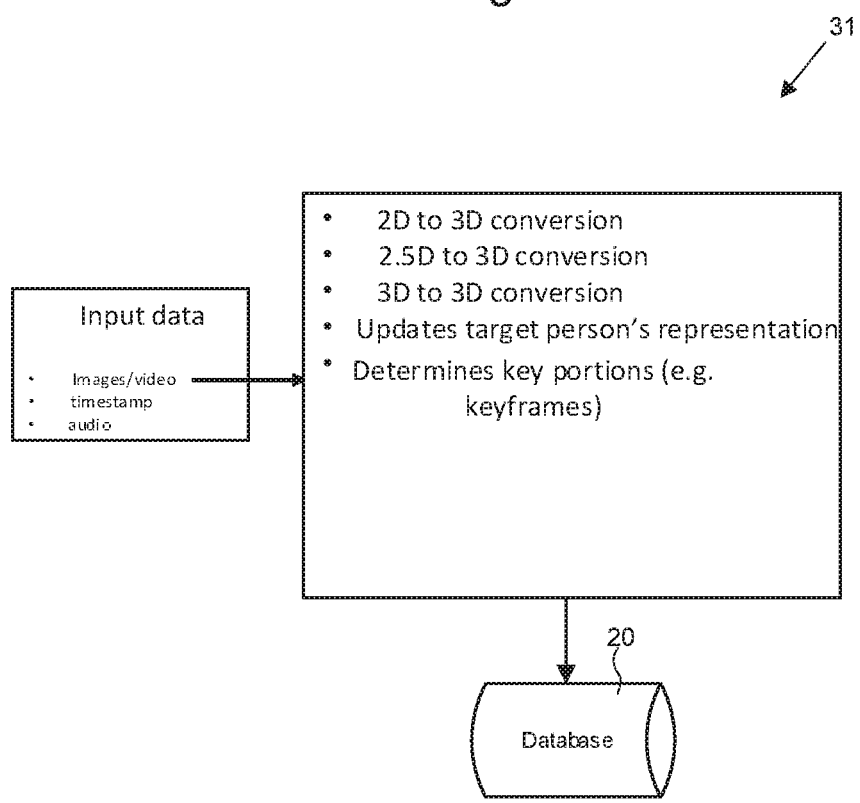
FIG. 7 is a schematic diagram depicting an acquisition system of the framework of FIG. 6.

FIG. 7 depicts an example configuration for the acquisition system 31. The acquisition system 31 receives input data from the first sensor system 5 (e.g. images/video, timestamps, audio). The target person and reference person are the same user. The input data therefore corresponds both to input data for producing the output data to provide a synchronized animated visual representation and measurement data for augmenting the contents of the database 20. In some embodiments, the acquisition system 31 performs incremental updating of the database 20 according to any of the methods described above. This may include, for example, converting input data from 2D to 3D, from 2.5D to 3D, or from 3D to 3D. The acquisition system 31 may update a representation of the target person (e.g. by adding more key portions 26 to the database 20).

Figure 8:
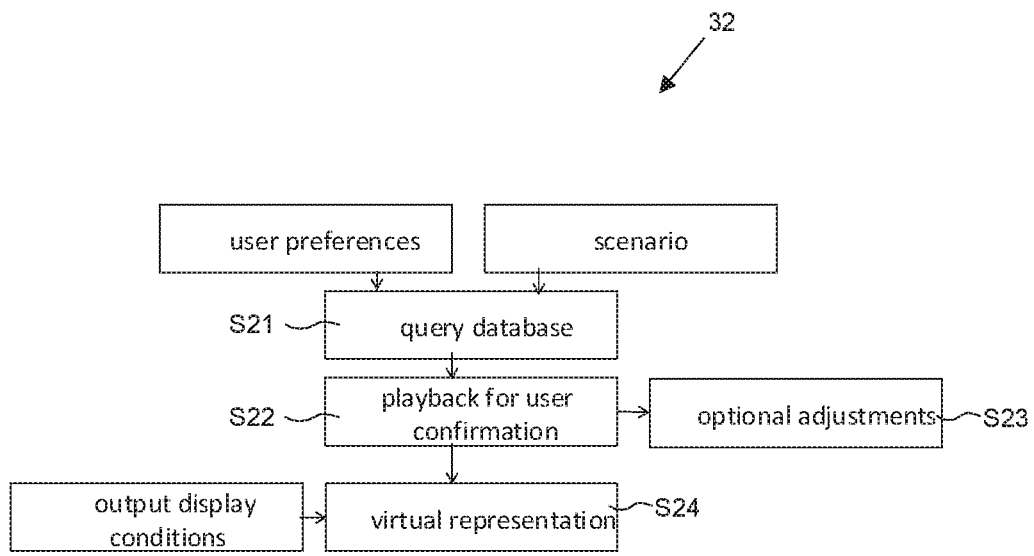
FIG. 8 is a schematic diagram depicting a lookup unit of the framework of FIG. 6.

FIG. 8 depicts an example configuration for the lookup system 32. The lookup system 32 may allow the target user to select a preferred virtual representation. A query database step S21 may receive input from the target person in the form of a set of personalized edits and augmentations based on user preferences (e.g. preferred lighting settings, hairstyle, etc.) and use case scenario. Example augmentations and edits are: change user's hairstyle/facial hair; adjust lighting and background; adjust user's facial appearance (slimmer/fatter face, smaller nose); adjust the user's facial expressions to a desired mood (happy, sad); adjust user's skin tone and makeup; add fashion accessories and preferred attire; add virtual 3D assets (e.g. glasses, angel wings); transfer user's characteristics and behaviour to a completely different virtual character (e.g. cat, elf, celebrity). Example scenarios may include one or more of the following: interview for a job; video conference call with client, boss; video call with family and friends; online gaming; live streaming (e-gaming, youtube, twitch). The query database step S21 queries the database in accordance with the input from the target person. This may include looking for a data unit 22 containing information about a reference person (e.g. the target person) in a reference state that most closely matches the input from the target person.

In the embodiment shown, in step S22 a visual representation corresponding to an input unit 22 selected in the database in response to the query of step S21 is played back to the target person. The target person may then accept the selection, reject the selection, or make adjustments to the selection (step S23). In step S24, a virtual representation is generated ready for forwarding to the runtime system 33.

The virtual representation may optionally take into account output display conditions (e.g. lighting conditions, size of display, etc.) at the remote system 14.

FIGS. 9-13 depict different example implementations of the runtime system 33A-D, each implementation corresponding to a different type of input from the first sensor system 5. In each case the runtime system 33A-D provides output data in real time to the remote system 14 to allow the remote system to provide the animated visual representation synchronized with the target person.

Figure 9:
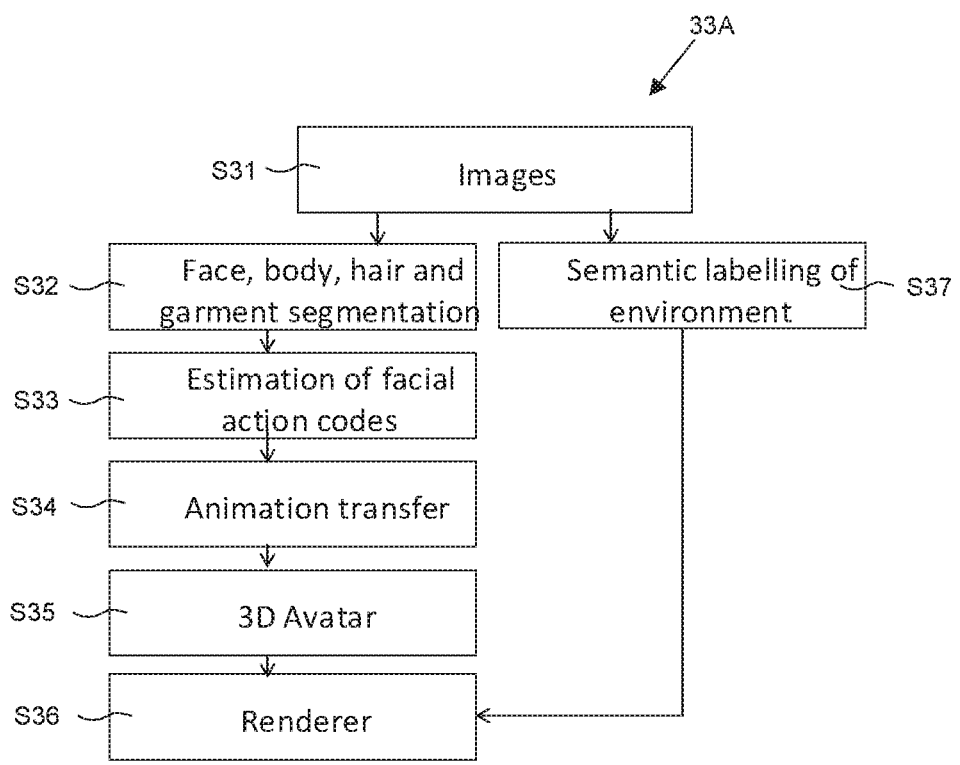
FIG. 9 is a schematic diagram depicting an example runtime system of the framework of FIG. 6 for video input data.

FIG. 9 depicts an implementation of the runtime system 33A in a case where the first sensor system 5 provides a video stream of images. Live video frames are used to estimate facial action codes (see, for example, P. Ekman and W. Friesen. Facial Action Coding System: A Technique for the Measurement of Facial Movement. Consulting Psychologists Press, Palo Alto, 1978, herein incorporated by reference in its entirety). The estimated facial action code animations are transferred to the virtual representations. Thus, in step S31 images (video frames) are provided. The images are processed in step S32 to perform segmentation of, for example, face, body, hair, garments, etc. Facial action codes are obtained in step S33. Animation transfer is performed in step S34 to modify a 3D avatar in step S35. The modified 3D avatar is rendered in step S36. Semantic labelling (step S37) of the environment (as described above) may be used to provide input to the rendering step.

Figure 10:
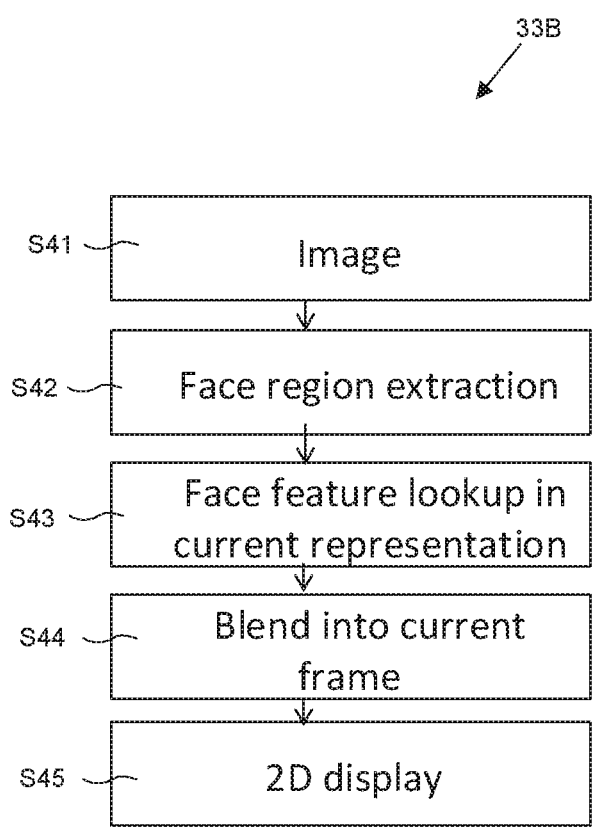
FIG. 10 is a schematic diagram depicting an example runtime system of the framework of FIG. 6 for image input data.

FIG. 10 depicts an implementation of the runtime system 33B in a case where the first sensor system 5 provides one or more individual 2D images. In this embodiment, 2D image features are used to match a desired representation onto a 2D image frame. Thus, in step S41 an image is provided. The image is processed in step S42 to extract a face region of interest. In step S43 the extracted face region is used to look up a corresponding representation in the database 20. The corresponding representation is blended into a current frame (corresponding to the image provided in step S41) and sent for 2D display in step S45.

Figure 11:
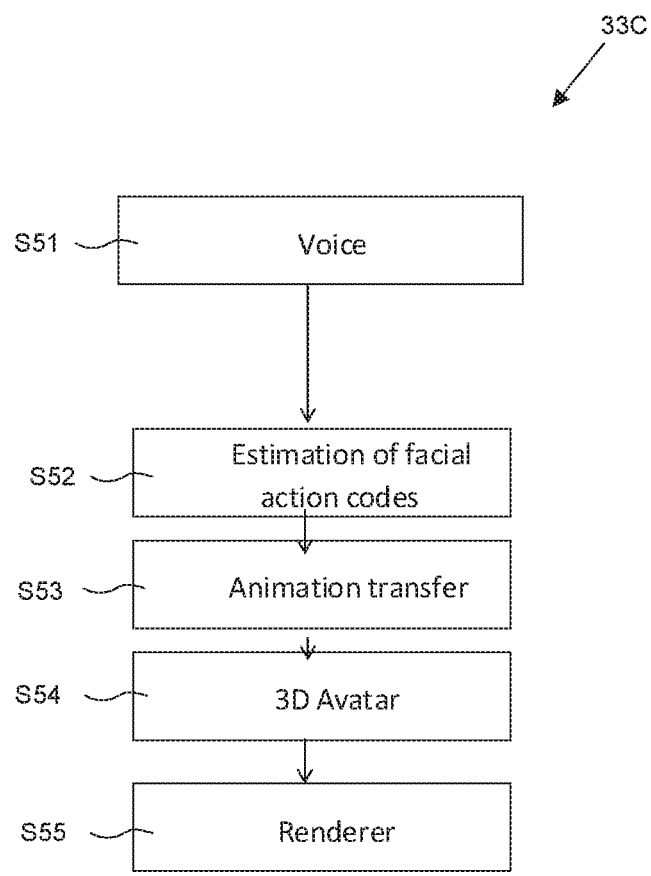
FIG. 11 is a schematic diagram depicting an example runtime system of the framework of FIG. 6 for voice input data.

FIG. 11 depicts an implementation of the runtime system 33C in a case where the first sensor system 5 provides audio data. In this example, a voice of the target person is used to animate their virtual representation. This allows the target person to connect to a virtual environment with a voice call. Thus, in step S51, audio data is provided. In step S52, the audio data is used to estimate facial action codes. Animation transfer is performed in step S53 to modify a 3D avatar in step S54. The modified 3D avatar is rendered in step S55.

Figure 12:
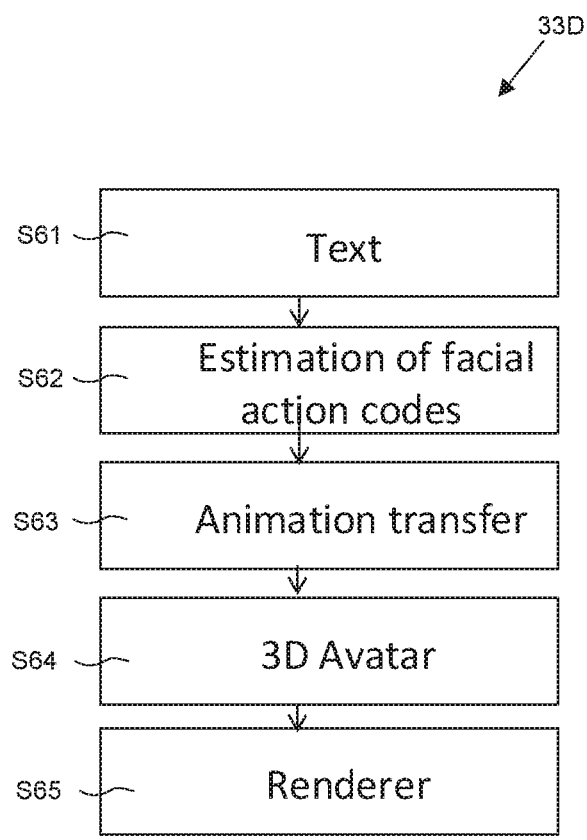
FIG. 12 is a schematic diagram depicting an example runtime system of the framework of FIG. 6 for text input data.

FIG. 12 depicts an implementation of the runtime system 33D in a case where the first sensor system 5 provides text data (an example of input from a haptic input sensor—e.g. a touch screen on a mobile phone or tablet computer). This allows the target person to use text to provide an animated visual representation of themselves. The animated visual representation may comprise a visual representation of the target person speaking words corresponding to the text for example. Thus, in step S61, text data is provided. In step S62, the text data is used to estimate facial action codes. Animation transfer is performed in step S63 to modify a 3D avatar in step S64. The modified 3D avatar is rendered in step S65.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method of generating data to provide an animated visual representation, comprising:
    receiving input data obtained by a first sensor system measuring information about at least one target person;
    selecting one data unit from a database comprising a plurality of the data units, wherein each data unit comprises information about a reference person in a reference state measured at a previous time by the first sensor system or by a second sensor system, the information in each data unit is such as to allow generation of an animated visual representation of the reference person in the reference state, and the reference state is different for each of the data units; and
    using the selected data unit and the input data to generate output data usable to provide an animated visual representation corresponding to the target person and synchronized with activity of the target person measured by the first sensor system.

2. The method of claim 1, wherein either or both of the first sensor system and the second sensor system comprise one or more of the following: a camera, a depth sensor, a microphone, an accelerometer, a gyroscopic sensor, and a haptic input sensor.

3. The method of claim 1, wherein the activity of the person comprises relative movement of one or more parts of the body, optionally including changes in one or more of posture and facial expression.

4. The method of claim 1, wherein the activity of the person comprises generating sound vocally.

5. The method of claim 1, further comprising incrementally updating the database using measurement data from the first sensor system or the second sensor system.

6. The method of claim 5, wherein the incremental updating of the database comprises detecting key portions of the measurement data and recording the detected key portions in preference to other portions of the measurement data.

7. The method of claim 6, wherein the detecting of the key portions comprises determining a degree of similarity between a candidate portion and one or more other portions of the measurement data, the candidate portion being selected as a key portion only if the degree of similarity is lower than a predetermined threshold.

8. The method of claim 6, wherein the detecting of the key portions comprises determining a quality metric of a candidate portion, the candidate portion not being selected as a key portion if a value of the quality metric is lower than a predetermined threshold.

9. The method of claim 8, wherein the quality metric comprises information about one or more of the following:
a quality of focus in an image;
a degree of contrast in an image; and
a degree to which the reference person is present in an image.

10. The method of claim 5, wherein each of one of more of the portions of measurement data is assigned to one of the data units depending on correspondence between content of each portion and the reference state of the data unit.

11. The method of claim 1, wherein each of one or more of the data units comprises multi-modal information, optionally including at least visual information and audio information.

12. The method of claim 11, wherein one or more of the data units comprising multi-modal information comprises visual information correlated with audio information measured at the same time as the visual information.

13. The method of claim 12, wherein the first sensor system measures only sound from the target person and the generation of the output data is performed using the correlation between the visual information and the audio information in a selected one of the data units.

14. The method of claim 1, wherein the first sensor system comprises a virtual reality headset and the animated visual representation comprises an animated visual representation of the target person without the headset.

15. The method of claim 1, wherein the reference person and the target person are the same person.

16. The method of claim 1, wherein the output data is transmitted over a network and used to provide an animated visual representation at a location remote from the target person.

17. The method of claim 16, wherein the provision of the animated visual representation is controlled according to one or more output parameters, the one or more output parameters including one or more of the following:
information from one or more sensors measuring environmental conditions at the location remote from the target person;
information from one or more sensors measuring the position, gaze direction, or both, of one or more people at the location remote from the target person; and
information about characteristics of a display apparatus at the location remote from the target person.

18. The method of claim 1, wherein the animated visual representation has one or more of the following modifications relative to the input data obtained by the first sensor system:
a gaze direction is changed;
apparent lighting conditions to which the target person is subjected are changed;
facial hair is removed, added, or modified;
a facial accessory or skin decoration is removed, added, or modified; and
a background is changed.

19. The method of claim 1, wherein the information about the reference person in the reference state in each of one or more of the data units comprises one or more of the following, while the reference person remains in the same reference state:
information about a visual appearance of the reference person from different viewing directions relative to the reference person;
information about a visual appearance of the reference person in different postures;
information about a visual appearance of the reference person with different facial expressions; and
information about a visual appearance of the reference person while making different vocal sounds.

20. The method of claim 1, wherein the information about the reference person in the reference state in each of one or more of the data units comprises one or more of the following:
a set of two-dimensional visual features;
a three-dimensional mesh, optionally including one or more of the following: colour information, surface information, surface texture information, surface roughness information, surface wrinkles information, information about animated objects on the surface; and
a compressed three-dimensional mesh, optionally including principle component analysis components over a principle component analysis basis of the mesh.

21. The method of claim 1, wherein the animated visual representation provides a tele-presence of the target person, optionally within a video game or video conference.

22. The method of claim 1, wherein the animated visual representation comprises a three-dimensional avatar not directly resembling the target person but animated to perform activities synchronized with activities of the target person measured by the first sensor system.

23. The method of claim 1, wherein the different reference states comprise one or more of the following:
the reference person being in multiple different locations;
the reference person being in multiple different environment conditions;
the reference person being exposed to multiple different weather conditions;
the reference person being exposed to multiple different lighting conditions;
the reference person wearing multiple different combinations of garments;
the reference person wearing multiple different skin decorations; and
the reference person being in multiple different moods.

24. A system for generating data to provide an animated visual representation, comprising:
a first computing system configured to:
receive input data obtained by a first sensor system measuring information about at least one target person;
select one data unit from a database comprising a plurality of the data units, wherein each data unit comprises information about a reference person in a reference state measured at a previous time by the first sensor system or by a second sensor system, the information in each data unit is such as to allow generation of an animated visual representation of the reference person in the reference state, and the reference state is different for each of the data units; and use the selected data unit and the input data to generate output data, wherein the output data is usable to provide an animated visual representation corresponding to the target person and synchronized with activity of the target person measured by the first sensor system.

25. The system of claim 24, further comprising:
a second computing system configured to:
receive the output data from the first computing system; and
use the output data to provide an animated visual representation corresponding to the target person and synchronized with activity of the target person measured by the first sensor system.

26. The system of claim 24, wherein the second computing system provides the animated visual representation in a virtual reality headset.

27. The system of claim 24, wherein the second computing system provides the animated representation in an autostereoscopic display.

28. The system of claim 24, wherein the first computing system is configured to generate or update the data units of the database using the first sensor system to measure the at least one target person.

29. The system of claim 28, wherein the first computing system comprises a mobile computing device having at least a video camera and a microphone or a desktop computer having at least a video camera and a microphone.

30. The system of claim 24, wherein the database is accessible by the first computing system and is not accessible by the second computing system.

* * * * *